United States Patent [19]

Cook

[11] Patent Number: 4,875,178

[45] Date of Patent: Oct. 17, 1989

[54] METHOD TO CONTROL THE DISCHARGE OF EFFLUENT

[76] Inventor: Leonard C. Cook, 9881 Tomahawk Trail, Wexford, Pa. 15090

[21] Appl. No.: 189,023

[22] Filed: May 2, 1988

[51] Int. Cl.⁴ .............................................. G06G 7/48
[52] U.S. Cl. .................................... 364/578; 364/502; 364/509
[58] Field of Search ............... 210/746, 96.1; 364/150, 364/502, 509, 510, 578

[56] References Cited

U.S. PATENT DOCUMENTS 4,626,992 12/1986 Greaves et al. ...................... 364/150
4,648,043 3/1987 O'Leary .............................. 364/502
4,700,884 10/1987 Barrett et al. ....................... 364/502

Primary Examiner—Allen MacDonald
Attorney, Agent, or Firm—Clifford A. Poff

[57] ABSTRACT

A method to control the discharge of wastewater to receiving waters includes using a site specific computer program model to predict the amount of wastewater which can be discharged to the receiving waters. A signal derived from the computer model is used for controlling values, sluice gates, or pumps to thereby control the discharge of the wastewater. The computer program model is provided with a series of equations dealing with physical, chemical and biological data and with site specific data of the receiving stream so that wastewater discharge is carried out on a real time basis.

12 Claims, 3 Drawing Sheets

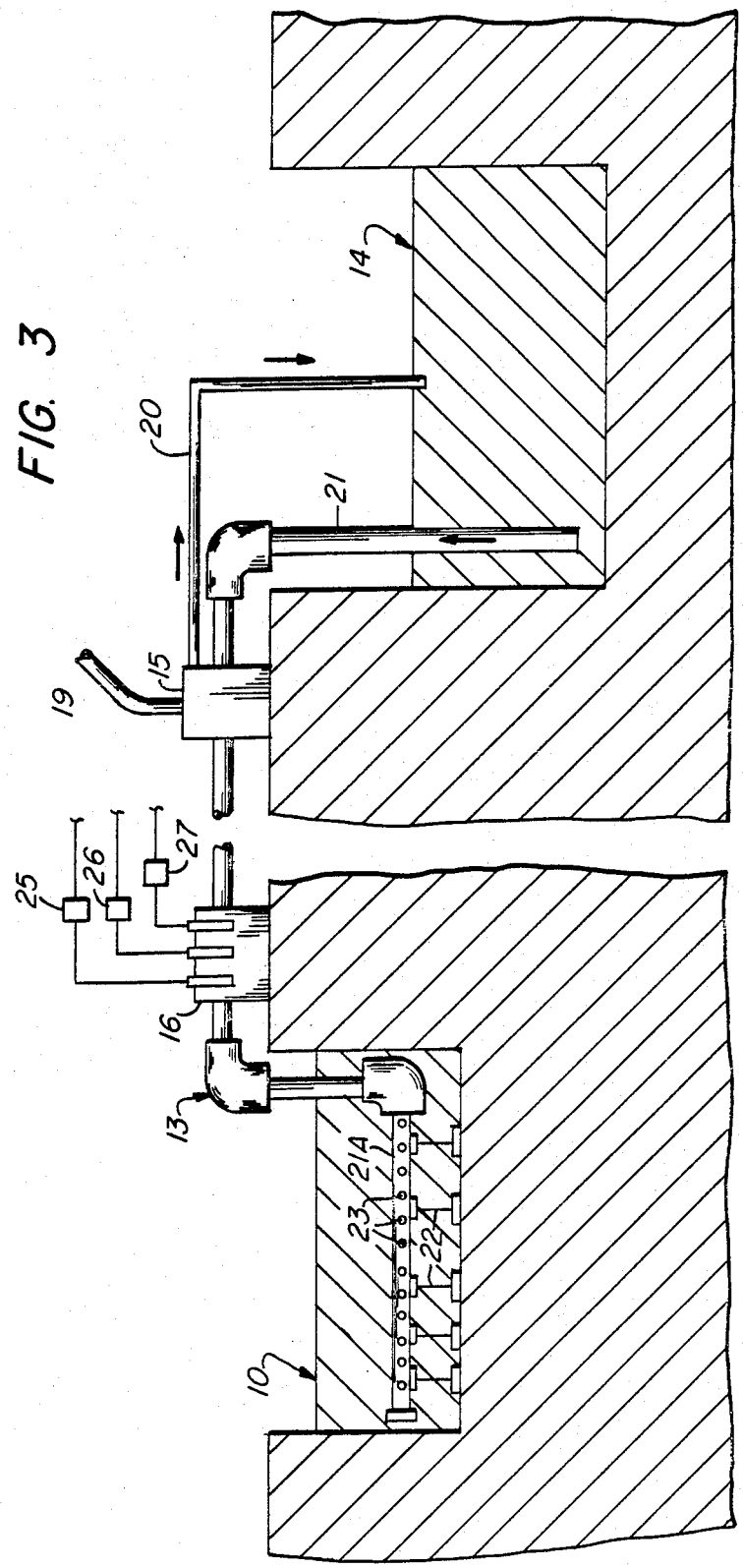

METHOD TO CONTROL THE DISCHARGE OF EFFLUENT

BACKGROUND OF THE INVENTION

1. Field of the Invention: This invention relates to a method for monitoring and/or controlling the discharge of effluent to a receiving stream of water in such a manner so as to assure the maintenance of pre-established water quality requirements, particularly, for example, compliance with regulatory water quality standards for the receiving waters downstream of the effluent discharge site. More particularly, the present invention provides for an effluent discharge control system including an algorithm using inputs corresponding to upstream water quality characteristics and flow rate, the characteristic of the effluent which is to be discharged, characteristics of the receiving water downstream of the effluent discharge site within the zone of influence, actual downstream water quality characterizes for comparison with a prescribed water quality characteristic, and site specific conditions of the receiving waters.

2. Description of the Prior Art: One of the most significant Governmental regulation governing the discharge of an effluent by anyone is the requirement for a basic level of effluent treatment. Effluent treatment at a basic level is defined by the best available treatment technology for the particular effluent. Whether it be municipal sewage or industrial wastewater, this level of treatment must be attained under any and all circumstances before site-specific flow based limitations can be considered for meeting water quality based limitations in the receiving body of water. It is under these conditions that real time water quality management, flow based limitations, or any other innovative treatment technology can be considered by the regulatory agencies in the permitting process.

Federal and State statutes regulate water quality standards for various bodies of water. The rationale used by the regulatory agencies to protect the designated use of a body of water is to determine the wasteload allocation for an effluent to be discharged based upon a 7-day consecutive set of site specific condition occurring once every ten years. This site specific condition along with a set of well known equations form the basis for the calculations to establish the level of pollutants that can be discharged to the receiving waters without violating any of the prescribed water quality standards. Thus, anyone, particularly a manufacturer, desiring to discharge effluent into a regulated receiving body of water must comply with applicable site specific water quality standards. To assure compliance with such standards, it is convenient to ascertain the quantity of the effluent to be discharged so that a flow rate of wastewater to be discharged can be established and still meet regulatory water quality criteria established for the receiving waters. Owing to the lag time necessary for assimilation of the effluent discharge to the receiving stream, real time control of an effluent discharge could not be reliably utilized. Because of such a time lag, assurances could not be given, for example, that instream water quality standards are met without deviation, and particularly when such standards are of a government regulation. In the case of a direct discharger who is meeting the technology based level of treatment but the quality of the effluent is not sufficient to protect the water quality standards of the receiving body of water, the regulatory agency is required to impose water quality based limits on the discharger.

The present invention seeks to provide a system to enable a discharger of effluent to protect the designated water quality standards in the receiving body of water. In the system of the present invention, water quality is monitored upstream and downstream of a point source discharge of effluent as well as other parameters, such as flow rate, and an analysis is made of the effluent so that the effluent can be discharged to the receiving water while protecting water quality standards in the receiving waters. Thus, the present invention seeks to provide an effluent management control which is unlike systems known in the art, because this invention seeks to utilize more of the available assimilative capacity of the receiving waters without violating any of the prescribed water quality standards. This is accomplished by inputs of characteristics of the effluent to be discharged and site specific characteristics of the receiving waters assimilative capacity on a real time basis. Such basis for an effluent management control is more realistic than current practice which uilizes the most critical set of conditions that may or may not exist simultaneously in the receiving waters once every ten years according to the 7-day consecutive set of site specific conditions. Examples of known wastewater control can be found in U.S. Pat. Nos. 3,929,017; 3,974,940; 4,295,197; 4,353,181; 4,386,409; 4,468,043; 4,700,568; and 4,708,021.

SUMMARY OF THE INVENTION

It is an object of the present invention to provide effluent management control system which is capable of processing input data on a daily and/or continuous basis and controlling the discharge of effluent at all times so that the zone of influence by the effluent discharge in the receiving waters affected by the effluent does not create an exceedance of any prescribed water quality standards at any time.

It is a further object of the present invention to provide a method for discharging effluent to receiving waters through the use of a computer program utilizing an algorithm which is tailored to site specific conditions, including but not limited to, the real time assimilative capacity of the receiving waters and the characteristics of the effluent to be discharged.

More particularly according to the present invention there is provided a method to control the discharge of effluent to receiving waters wherein the method includes the steps of using a site specific computer program model to predict the character of the receiving water beyond the point of discharge of effluent beyond a zone of mixing and controlling the discharge of effluent to the receiving water so as not to exceed any prescribed water quality criteria that may exist to protect the prescribed use of the receiving waters.

To protect the receiving waters at all times, a series of calculations must be performed each time there is a change in either the physical, chemical, or biological character of the effluent or the receiving waters. This series of calculations and the resultant effluent flow rate control are performed as rapidly as necessary. In the present invention, the algorithm used to control the rate of discharge of effluent to receiving waters includes a use of an expression of the mess balance principle which is stated:

$$F_{ed} = \frac{F^d{}_{nstm} \times C_{dstrm} - F_{upstrm} \times C_{upstm}}{C_{ed}}$$

where:
$F_{ed}$ is equal to the flow rate of effluent discharge;
$F_{dnstm}$ is equal to the flow rate of the receiving waters downstream of the effluent discharge;
$C_{dnstm}$ is equal to the predetermined maximum allowable concentration in the receiving waters;
$F_{upstm}$ is equal to the rate of stream flow upstream of the effluent discharge;
$C_{upstm}$ equal to the concentration of the substance upstream of the effluent discharge; and
$C_{ed}$ is equal to the concentration of the substance in the effluent discharge.

This equation is used to determine the rate of effluent flow at the point of discharge to protect the receiving waters at all times at the zone of mixing and within the entire zone of influence. The quantity of any and all constituents introduced by the effluent to the receiving waters are thus controlled in this manner. To obtain an accurate assessment of constituent concentrations in all receiving waters and effluent, a flow weighted average is computed according to the following expression:

$$C_w = \frac{\sum_{i=1}^{n} X^i \times Q^i}{\sum_{i=1}^{n} Q^i}$$

where:
$C_w$ is the flow weighted concentration of the constitute;
$X^i$ is equal to the average concentration of constitute during the $i^{th}$ time period;
$Q_i$ is equal to the average flow rate during the $i^{th}$ time period; and
n is the number of observations.

The present invention further provides that the algorithm includes mathematical expressions or equations for using measurements of parameters and site specific conditions as a basis for computations carried out according to the mass balance principle.

In view of the forgoing and the following detailed description it will be apparent to one skilled in this art that the present invention provides industries and/or municipalities, that must discharge treated wastewaters under the state/federal National Ppllutant Discharge Elimination System (NPDES), with a very cost effective method for fully protecting the environment while utilizing the maximum assimilative capacity of the receiving waters. This invention is ideally suited to facilities that discharge effluent to high water quality receiving waters.

DETAILED DESCRIPTION OF THE DRAWINGS

Figure 1:
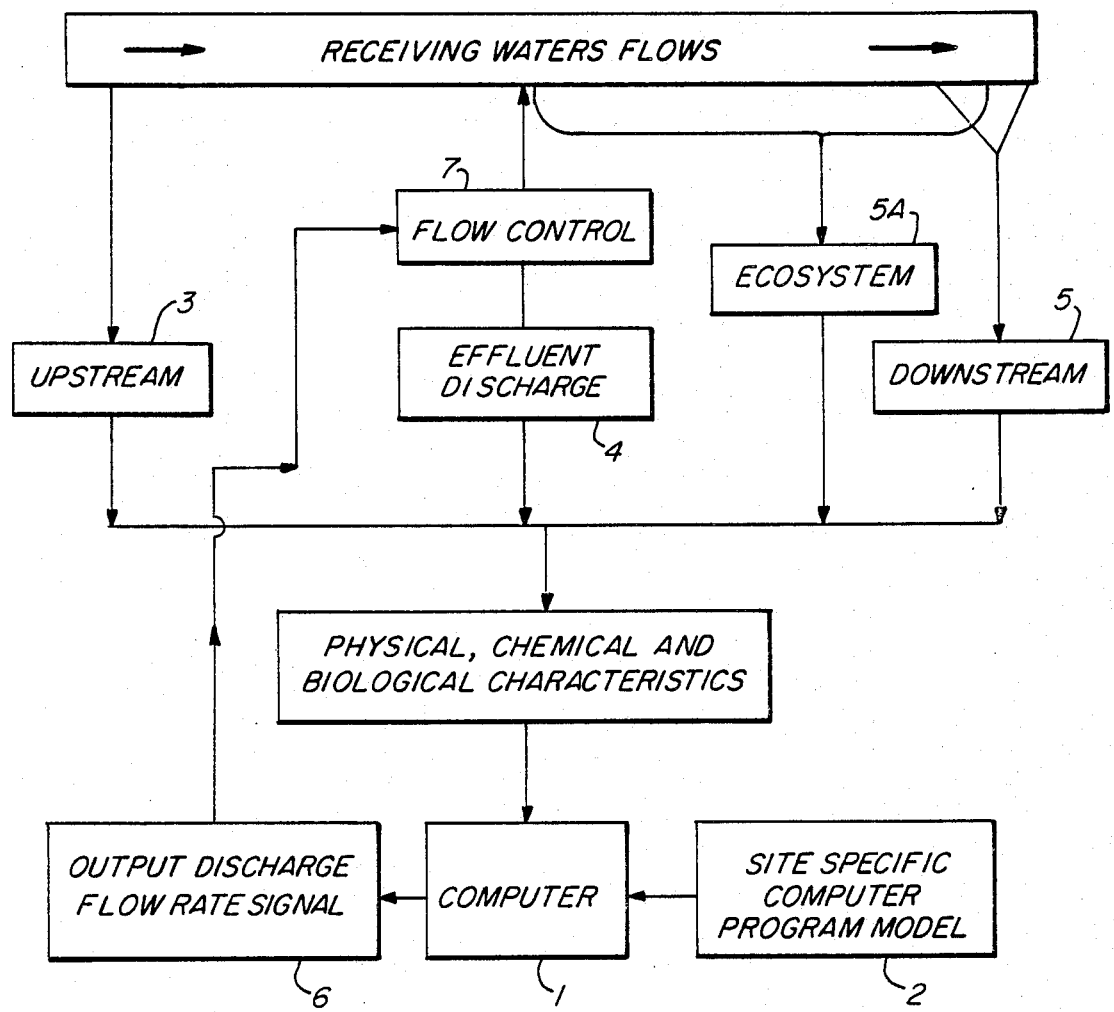
Figure 2:
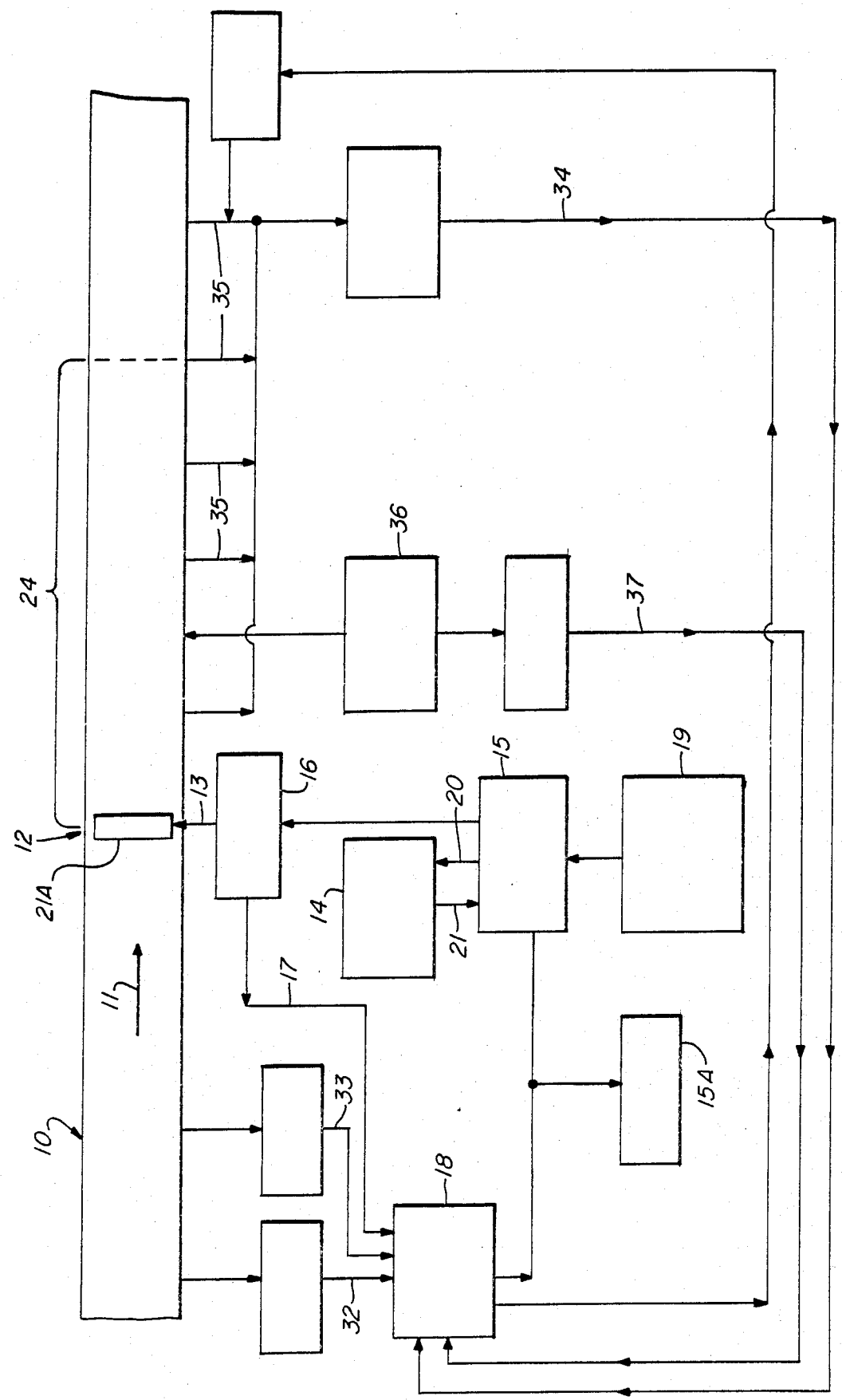

These features and advantages of the present invention as well as others will be more fully understood when the following description is read in light of the accompanying drawings in which:

FIG. 1 is a simplified block diagram of a system to control the discharge of effluent to the receiving waters according to the present invention;

FIG. 2 schematically illustrates one embodiment of system to carry-out effluent discharge management control according to the present invention; and FIG. 3 is a cross-sectional view illustrating the typical arrangement of an effluent discharge apparatus to ensure maximize a complete mixing at the point of discharge of effluent into the receiving water.

DETAILED DESCRIPTION OF THE PREFERRED EMBODIMENTS

The detailed description of the preferred embodiments, as depicted in FIG. 1, is provided for the purpose of disclosing the present invention. In FIG. 1, the system illustrated by the block diagram includes a processing means 1 which may, for example, a computer capable of operating under MS DOS (Microsoft Disk Operating System), an example of which is an International Business Machines Corporation computer, model AT, or the like, containing at least 560K of ram memory. The internal hardware of the computer includes a ten megabyte hard disk drive, a floppy disc drive and output ports coupled to a printer or other suitable peripheral device for making a hard copy of output data. Loaded into the computer is a site-specific computer model program identified in FIG. 1 by reference numeral 2. As will be explained in greater detail hereinafter, the program in its preferred form is made up of a number of systems which includes ammonia toxicity evaluations, dissolved oxygen determination and a series of mass balance and flow weighted average calculations. The computer receives input data either by way of keyboard inputs or electronic signals which are processed in a manner, per se, well known in the art to the computer. A first set of signals comprising chemical, physical and biological characteristics of the receiving stream upstream of the effluent discharge site are fed into the computer and identified in FIG. 1 by reference numeral 3. Identified by reference numeral 4 is a set of characteristics of the discharge effluent which is input to the computer and comprises physical, biological, chemical and an assumed flow rate of the effluent discharge. Further characteristics involving the ecosystem are input from block 5A and take the form of physical, chemical and biological characteristics of the receiving waters downstream of the effluent discharge. All of the data collected for all of these site locations are comprised of biological, physical and chemical characteristics. Derived from the computer is an analogue signal 6 which is sent to a discharge control system 7. The system 7 controls the flow rate of effluent from a storage site, for example, to receiving waters. The effluent flow rate is measured by a rate measuring device 9 which produces an electrical signal that is delivered to the computer 1. This signal representing the actual effluent flow rate is utilized according to the program, inter alloy, as a verifier to the actual effluent discharge rate of flow.

Those skilled in the art will understand, of course, that the output from the computer 1, as well as the input, can be manual, i.e., keyboard inputs and printouts showing flow discharge rates which can be used to manually select a desired effluent discharge rate.

In FIG. 2 reference numeral 10 identifies receiving body of water which can be a continuous or intermittent flowing stream, brook, river, channel, canal or any type of natural or man-made conduit that provides for the flow of water in the direction indicated by arrow 11. At some suitable site 12 along the receiving body of water, there is constructed a conduit 13 for discharging effluent such as treated wastewater to the receiving water. The conduit is arrange in a manner to be described hereinafter for delivering wastewater from a source such as an on site manufacturing process and including a wastewater storage lagoon. The wastewater that is generated can be discharged directly from a storage lagoon and/or directly from the generation source.

In FIG. 2 a wastewater storage site is a lagoon 14. The lagoon 14 is only an example, as one skilled in the art knows, of one form of a storage facility for wastewater. The wastewater can be stored in a container or by other conventional means without departing from the spirit of the present invention. The wastewater is discharged by a control system 15 and the wastewater is analyzed by a discharge monitor system 16 by sampling and analyzing the wastewater either on a continuous or intermittent basis at preselected time intervals to determine not only the qualities of components, but also an analysis of the volume of each component, particularly, those components which are of significance with respect to imparting or causing ecology affect in the receiving waters. The analysis of the wastewater discharge can be made either by laboratory analysis or by automated use of electronic probes so that the analytical data can be input by line 17 of a keyboard, for example, to a computer 18 which is the same as computer 1 in FIG. 1.

Data is feed to the computer describing the physical, chemical and biological properties of the wastewater. The computer establishes an assumed flow rate of effluent to the receiving waters in order to determine a permissible wastewater flow rate which is in the form of an output signal displayed by a readout storage device 15A. The output signal is also fed to the discharge control system 15 which includes diverters and controllers for a primary source of wastewater. The wastewater in the lagoon can be mixed with wastewater from a primary source 19 or only wastewater from the lagoon or only wastewater from the primary source can be controlled for delivery by the discharge control system 15. For this purpose, pumps, weirs, sluice gates or other well known forms of flow rate controls may be used to establish and maintain a permissible flow of wastewater to the receiving water. Also, the discharge control system 15 includes a by-pass conduit 20 to permit a flow of all or a part of the wastewater or other effluent from the generation site 19 to the lagoon 14.

In FIG. 3, there is illustrated a typical arrangement of an wastewater discharge system intended to cause thorough mixing of effluent with the receiving waters. A supply pipe 21 in the lagoon 14 feeds wastewater to discharge header 21A which is anchored transversely in the receiving stream 10 to stream bed by anchors 22 so that the wastewater emerging from a multiplicity of ports 23 can be thoroughly and rapidly mixed at the entry site in the receiving waters. In this way assimilation of wastewater can be assured within a defined or established zone of influence 24, as shown in FIG. 2. The zone of influence is critically important and is defined as the point in the receiving waters beginning at the point of discharge of the primary wastewater source and continuing downstream to a location in which any one of the prescribed water quality criteria comes the nearest to equaling the Water Quality criteria limitation for that particular parameter and the assimilative capacity of the receiving water immediately thereafter beings to increase. The zone of influence is determined by the computer program model with the computer transmitting a signal for locating the point at which automatic and/or manual sampling collection and/or manual or automatic monitoring can be instituted for data input from the downstream monitoring system back into the computer program model.

In the discharge monitor 16 shown in Figure 3, there is a monitor probe 25 which provides an electrical output signal corresponding to the flow rate of wastewater to the discharge header. Other probes 26 and 27 are included in the discharge monitor 16 and provide electrical output signals including but not limited to pH, dissolved oxygen, temperature, ammonia, chlorides, and/or other specific ion detection probes that the site specific receiving waters and prescribed Water Quality Standards mandate as necessary. Probes for monitoring other biological and chemical parameters can be used when desired or mandated in the discharge header. The electrical signals from monitor 16 are input by line 17, as shown in FIG. 2, to computer 18. The electrical signals corresponding to the wastewater discharge flow rae, pH and dissolved oxygen content may be in the form of signals from a microprocessor or readout data can be manually introduced by a keyboard to the computer. The computer receives other input signals. In the preferred form these input signals comprise an upstream analysis of the receiving water taken at a place identified by reference numeral 31 and selected at a convenient location before the receiving water passes the discharge header 21A. The upstream analysis as well as the downstream and effluent analysis are all sampled to determine the biological, chemical, and physical properties. The analysis of the upstream sampling is input by line 32 to the computer. The periodic and/or continuous monitoring of the character of the receiving waters include the flow rate of the receiving waters. The frequency of such analysis must be evaluated according to a known degree of variability and the sampling periods must reasonably coincident with each other. Also included as inputs to the computer by line 33 are site specific conditions for the ecosystem through the zone of influence 24 in the receiving waters.

The characterization of the ecosystem defines specific conditions which specify the site specific assimilative capacity of the receiving waters as well as, where applicable or desirable, provides the state and/or federal regulatory agencies with supporting documentation so that compliance with water quality standards for the receiving waters is being maintained. The site specific information of the ecosystem is supplied to the computer program model on a seasonal basis, annual basis and/or as frequently as necessary to reflect any resultant change in the receiving waters natural assimilative capacity to accommodate the discharge of the wastewater without violating water quality standards. The sample (grab, composite, continuous) may vary in accordance to site specific conditions of the upstream receiving waters and the ecosystem of the receiving waters through the zone of influence. Such type and frequency of analyses and/or monitoring requirements for effluent discharge and receiving waters upstream and downstream of the discharge location include, but are not necessarily limited to the following parameters: aluminum, ammonia nitrogen, bariums, bio-assays, benthics, bio-chemical oxygen demand (BOD), cadmium, Chloride, Copper, Cyanide, Dissolved Oxygen, Fecal Coliform, Flow rate, Hardness, Iron, Lead, Magnesium, Manganese, Mercury, Nickel, Nitrate, Nitrates, Oil & Grease, pH, Phenolic compounds, Selenium, Silver, Temperature, Total residual Chlorine, Total Nitrogen, Total Organic Carbon, Total Suspended Solids, and Zinc, Carbonaneous BOD decay rates, nitrogenous BOD decay rates, reaeration rates, photosynthesis rates, algal respiration rates, sludge deposition oxygen utilization rates, and oxidation and denitrification rates of the various forms of organic nitrogen.

The computer receives other input signals including signals in line 34 corresponding to a plurality of samples taken at various locations spaced apart downstream of the wastewater discharge within the zone of influence 24. The analytical results derived from these sampling taken at sites 35 includes the aforementioned chemical, biological and physical parameters discussed for the upstream receiving waters. In a particular environment, it may be necessary to input analytical data derived from analyses of a secondary wastewater source 36 or sources, either direct (point source) or indirect (non-point source) contributory to the receiving waters within the zone of influence. The results of the analytical data of sources 36 is transmitted by line 37 to the computer.

The program model utilized according to the present invention, for the control of effluent discharge into the receiving stream utilizes in one aspect a mass balance evaluation wherein the program model is utilized to derive through calculation concentrations of a substance in the receiving stream according to a mass balance principle.

To obtain a more representative assessment of constituent concentrations in the receiving waters upstream and downstream of the discharge site as well as the wastewater, a flow weighted average is computed using the expression:

$$C_w = \frac{\sum_{i=1}^{n} X^i \times Q^i}{\sum_{i=1}^{n} Q^i}$$

where:

$C_2$ is the flow weighted concentration of the constitute;
$X^i$ is equal to the average concentration of constitute during the $i^{th}$ time period;
$Q^i$ is equal to the average flow rate during the $i^{th}$ time period; and
n is the number of observations.

Accordingly, therefore the computer program model utilizes input data as described hereinbefore to computer the accumulation of any or all constitute component of the effluent which must be monitored or may be introduced into the ecological system within the zone of influence. Thus, for example, a determination of the accumulation of a substance within the zone of influence is determined by the in-flow of the substance to the zone by the upstream receiving waters as well as the effluent minus the outflow or utilization of the substance in the zone.

The present invention utilizes mass balance calculations in a program model wherein parameters for determining the concentrations of a substance in the receiving a stream downstream of the effluent discharge is equal to the sum of the product of the flow times the concentration of each contributory source all divided by the sum of the total flow of all such contributing sources as further illustrated in the following equations:

$$F_{ed} = \frac{F_{d^n stm} \times C_{dnstrm} - F_{upstrm} \times C_{upstm}}{C_{ed}}$$

where:

$F_{ed}$ is equal to the flow rate of effluent discharge;
$F_{dnstm}$ is equal to the flow rate of the receiving waters downstream of the effluent discharge;
$C_{dnstm}$ is equal to the predetermined maximum allowable concentration of a substance in the receiving waters downstream of the effluent discharge;
$F_{upstm}$ is equal to the rate of stream flow upstream of the effluent discharge;
$C_{upstm}$ is equal to the concentration of the substance upstream of the discharge; and
$C_{ed}$ is equal to the concentration of the substance in the effluent discharge.

This mass balance equation is used in the present invention to regulate permissible wastewater discharge which contains substances of the type and at a frequency as described hereinbefore, and to satisfy a predetermined maximum allowable concentration of the regulated substance. For example, the computer model uses a mthematical equation to determine the concentration of un-ionized ammonia. Ammonia nitrogen toxicity calculations are determined by the program model to insure that the flow of wastewater to the receiving stream does not create a violation of the instream water quality criteria for un-ionized ammonia nitrogen or some other pre-established criteria. The concentration of un-ionized ammonia is determined from the values of the total ammonia nitrogen, pH and temperature according to the equation;

$$UAN = \frac{K_1 \times AN}{1 + 10^{(K_2 t - pH)}}$$

where:

UAN is the un-ionized ammonia-nitrogen concentration of the liquid sample;
K1 is a constant;
AN is the ammonia-nitrogen concentration;
K2 is a constant;
t is the temperature of the liquid sample; and
pH is the negative log of the hydrogen ion concentration in the liquid sample.

Additional calculations based on flow weighted mass balance principle, are used in the effluent discharge control system in response to monitoring of physical properties, particularly pH, temperature and flow rates. The assimilative property of the receiving stream can be effectively used to a far greater extent than utilized in the past according to known discharge control standards by operating the effluent discharge control system to include the rate of dissolved oxygen utilization and dissolved oxygen sag location in the receiving waters. In this regard, depletion of the dissolved oxygen content through the discharge of effluent is controlled by controlling the amount of effluent discharged to the receiving stream based on the determination of the actual depletion of the dissolved oxygen at various locations in the receiving waters. The computation for this purpose is based on the equation:

$$D_{Oinstm} = D_{Osat} D_{Odef}$$

where:

$D_{Oinstm}$ is the dissolved oxygen of the receiving water at time t;

$D_{Osat}$ is the dissolved oxygen saturation level at water temperature at time t; and $D^0_{def}$ is dissolved oxygen deficit at time t.

Instream dissolved oxygen calculations are performed by the program model to insure that the flow of wastewater to the receiving waters does not create a violation of instream water quality criteria for dissolved oxygen and does not violate any prescribed regulatory requirements. As explained previously, the wastewater is discharged to the receiving stream so that it is distributed evenly over the cross section of the receiving stream with little or no mixing occurring along the axis of the receiving water. Complete mix at the point of discharge of the wastewater into the receiving stream is ideal.

The dissolved oxygen deficit at time t in the receiving stream can be determined according to the equation:

$$D_{0def} = D_i e^{-Kat} + \left[\frac{KdLo(e^{-Kdt} - e^{-Kat})}{K_a - Kd}\right] +$$

$$\left[\frac{K_n L_n (e^{-Kdt} - e^{-Kat})}{Ka - K_n}\right] + \left[\frac{S + R - P}{K_a}\right] + [1 - e^{-Kat}]$$

where:

$D_{Odef}$ is the dissolved oxygen deficit in the receiving waters at time t(mg/l);

Ka is a site specific first order reaction rates constant for reaeration which is equal to a given constant times the site specific slope and velocity of the receiving water at time t;

$L_0$ is the total carbonaceous ultimate biochemical oxygen demand of wastewater discharges into the receiving waters, (mg/l);

$K_d$ is a site specific reaction constant for carbonaceous BOD decay;

t is site specific time in days;

$D_i$ is initial oxygen deficit in the receiving water at time t(mg/l);

$K_n$ is a site specific nitrogenous BOD decay rate constant;

$L_n$ is the site specific total nitrogenous biochemical oxygen demand of wastewater discharges into the receiving waters;

S is a site specific oxygen demand due to sludge deposition;

R is a site specific algal respiration; and

P is a site specific oxygen adjustment due to photosynthesis.

An examination of the above equation defining $D_{Odef}$ will show that this equation is emphatically dependent on site specific data which according to the present invention enables utilization of the assimilative properties of the receiving waters to a far greater extent and more accurately than utilized under the conventional seven day consecutive set of site specific conditions occurring once every ten years as discussd hereinbefore. It is important, as one skilled in the art will known and understand, that the flow rate of the receiving waters must be accurately ascertained particularly when the receiving water takes the form of a stream with a low natural flow, e.g., less than 100 CFS. In order to establish that the velocity of flow of the receiving water under this criteria, the following expression is used:

$$V = \frac{2.62 \; Q^{.56} \; S^{.083}}{DA^{.22}}$$

where:

V is the site specific velocity of the receiving waters, (miles per day);

Q is the receiving water flow (cfs);

S is the site specific slope of the receiving waters, (ft/mi); and

DA is the site specific drainage area to the receiving waters, (sq mi).

While the present invention has been described in connection with the preferred embodiment, it is to be understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

What I claim is:

1. A method to control the discharge of wastewater to a receiving body of water, said method including the steps of:

using a site specific computer program model to predict the character of the receiving water beyond the point of discharge of effluent in a zone of influence in response to a predetermined effluent discharge rate; and controlling the discharge of effluent to the receiving waters so as not to exceed predetermined water quality criteria of the receiving waters in the zone of influence.

2. A method to control the discharge of effluent to receiving waters including the steps of determining the flow rate of effluent to be discharged to the receiving waters according to the expression:

$$F_{ed} = \frac{F_{dnstm} \times C_{dnstrm} - F_{upstrm} \times C_{upstm}}{C_{ed}}$$

where:

$F_{ed}$ is equal to the flow rate of effluent discharge;

$F_{dnstm}$ is equal to the flow rate of the receiving waters downstream of the effluent discharge;

$C_{dnstm}$ is equal to the predetermined maximum allowable concentration of a substance in the receiving waters downstream of the effluent discharge;

$F_{upstm}$ is equal to the rate of stream flow upstream of the effluent discharge;

$C_{upstm}$ is equal to the concentration of the substance upstream of the discharge location; and $C_{ed}$ is equal to the concentration of the substance in the effluent discharge; and using a signal corresponding to a computed value of said $F_{ed}$ for controlling the discharge of effluent to the receiving waters so as not to exceed predetermined water quality criteria of the receiving waters in the zone of influence.

3. The method according to claim 2 wherein an assessment of constituents is made according to the expression:

$$C_w = \frac{\sum\limits_{i=1}^{n} X^i \times Q^i}{\sum\limits_{i=1}^{n} Q^i}$$

where:

$C_w$ is the flow weighted concentration of the constitute;

$X^i$ is equal to the average concentration of constitute during the $i^{th}$ time period;

$Q^i$ is equal to the average flow rate during the $i^{th}$ time period; and n is the number of observations.

4. The method according to claim 3 wherein said step of using a signal includes producing a signal according to the equation:

$$D_{Oinstm} = D_{Osat} - D_{Odef}$$

where:

$D_{Oinstm}$ is the dissolved oxygen of the receiving water at time t;

$D_{Osat}$ is the dissolved oxygen saturation level at water temperature at time T; and $D^O_{def}$ is dissolved oxygen deficit at time T.

5. The method according to claim 4 wherein said step of using a signal includes producing a signal according to the equation:

$$D_{Odef} = D_i e^{-K_a t} + \left[\frac{K_d L_0 (e^{-K_d t} - e^{-K_a t})}{K_a - K_d}\right] +$$

$$\left[\frac{K_n L_n (e^{-K_d t} - e^{-K_a t})}{K_a - K_n}\right] + \left[\frac{S + R - P}{K_a}\right] + [1 - e^{-K_a t}]$$

where:

$D_{Odef}$ is the dissolved oxygen deficit in the receiving waters at time t(mg/l);

Ka is a site specific first order reaction rate constant for reaeration which is equal to a given constant times the site specific slope and velocity of the receiving water at time t;

$L_0$ is the total carbonaceous ultimate biochemical oxygen demand of the waste water into the receiving waters, (mg/l);

Kd is a site specific reaction constant for carbonaceous BOD decay;

t is site specific time in days;

$D_i$ is initial oxygen deficit in the wastewater discharge in the receiving water at time t(mg/l);

$K_n$ is a site specific nitrogenous BOD decay rate constant;

$L_n$ is the total nitrogenous biochemical oxygen demand of the wastewater into the receiving waters.

S is a site specific oxygen demand due to sludge deposition;

R is s site specific algal respiration; and

P is a site specific oxygen adjustment due to photosynthesis.

6. The method according to claim 5 wherein said step of using a signal includes producing a signal according to the equation:

$$UAN = \frac{K_1 \times AN}{1 + 10^{(K_2 t - pH)}}$$

where:

UAN is the un-ionized ammonia-nitrogen concentration of the liquid sample;

K1 is a constant;

AN is the ammonia-nitrogen concentration;

K2 is a constant;

t is the temperature of the liquid sample; and pH is the negative log of the hydrogen ion concentration in the liquid sample.

7. The method according to claim 6 wherein said step of usig a signal includes producing a signal according to the equation:

$$UAN = \frac{K_1 \times AN}{1 + 10^{(K_2 t - pH)}}$$

where:

UAN is the un-ionized ammonia-nitrogen concentration of the liquid sample;

K1 is a constant;

AN is the ammonia-nitrogen concentration;

K2 is a constant;

t is the temperature of the liquid sample; and pH is the negative log of the hydrogen ion concentration in the liquid sample.

8. The method according to claim 7 wherein said step of using a singnal includes producing a signal according to the equation:

$$V = \frac{2.62 \ Q^{.56} \ S^{.083}}{DA^{.22}}$$

where:

V is the site specific velocity of the receiving water (miles per day);

Q is the water flow (cfs);

S is the site specific slope of the receiving water (ft/mi); and

DA is the site specific drainage area (sq mi).

9. The method according to claim 2 wherein said step of using a signal includes producing a signal according to the equation:

$$UAN = \frac{K_1 \times AN}{1 + 10^{(K_2 t - pH)}}$$

where:

UAN is the un-ionized ammonia-nitrogen concentration of the liquid sample;

K1 is a constant;

AN is the ammonia-nitrogen concentration;

K2 is a constant;

t is the temperature of the liquid sample; and pH is the negative log of the hydrogen ion concentration in the liquid sample.

10. The method according to claim 9 wherein said step of using a signal includes producing a signal according to the equation:

$$D_{Oinstm} = D_{Osat} - D_{Odef}$$

where:

$D_{Oinstm}$ is the dissolved oxygen of the receiving water at time t;

$D_{Osat}$ is the dissolved oxygen saturation level at water temperature at time t; and $D^O{}_{def}$ is dissolved oxygen deficit at time t.

11. The method according to claim 10 wherein said step of using a signal includes producing a signal according to the equation:

$$D_{0def} = D_i e^{-Kat} + \left[\frac{K_d L_0(e^{-Kdt} - e^{-Kat})}{K_a - K_d}\right] +$$

$$\left[\frac{K_n L_n (e^{-Kdt} - e^{-Kat})}{K_a - K_n}\right] + \left[\frac{S + R - P}{K_a}\right] + [1 - e^{-Kat}]$$

where:

$D_{Odef}$ is the dissolved oxygen deficit in the receiving waters at time t(mg/l);

$K_a$ is a site specific first order reaction rate constant for reaeration which is equal to a given constant times the site specific slope and velocity of the receiving water at time t;

$L_0$ is the total carbonaceous ultimate.

12. The method according to claim 11 wherein said step of using a signal includes producing a signal according to the equation:

$$V = \frac{2.62 \ Q^{.56} \ S^{.083}}{DA^{.22}}$$

where:

V is the site specific velocity of the receiving water (miles per day);

Q is the receiving water flow (cfs);

S is the site specific slope of the receiving water (ft/mi); and

DA is the site specific drainage area to the receiving waters (sq mi).

* * * * *